(12) United States Patent
Pieciak, Jr. et al.

(10) Patent No.: US 9,695,860 B2
(45) Date of Patent: Jul. 4, 2017

(54) WOOD DECKING SCREW

(71) Applicant: HANDY & HARMAN, White Plains, NY (US)

(72) Inventors: Joseph A. Pieciak, Jr., West Springfield, MA (US); Richard L. Belinda, Westfield, MA (US); Michael W. Maziarz, Wilbraham, MA (US); Tad A. Weiss, Westhampton, MA (US)

(73) Assignee: Handy & Harman, White Plains, NY (US)

( * ) Notice: Subject to any disclaimer, the term of this patent is extended or adjusted under 35 U.S.C. 154(b) by 132 days.

(21) Appl. No.: 14/429,605

(22) PCT Filed: Oct. 9, 2013

(86) PCT No.: PCT/US2013/063964
§ 371 (c)(1),
(2) Date: Mar. 19, 2015

(87) PCT Pub. No.: WO2014/058939
PCT Pub. Date: Apr. 17, 2014

(65) Prior Publication Data
US 2015/0233407 A1    Aug. 20, 2015

Related U.S. Application Data

(60) Provisional application No. 61/763,582, filed on Feb. 12, 2013, provisional application No. 61/711,247, filed on Oct. 9, 2012.

(51) Int. Cl.
*F16B 25/00* (2006.01)
*F16B 35/06* (2006.01)

(52) U.S. Cl.
CPC ...... *F16B 25/0042* (2013.01); *F16B 25/0015* (2013.01); *F16B 25/0057* (2013.01); *F16B 35/065* (2013.01)

(58) Field of Classification Search
CPC ............... F16B 25/0015; F16B 35/065; F16B 25/0057; F16B 25/10; F16B 35/103; F16B 25/103; F16B 39/282
(Continued)

(56) References Cited

U.S. PATENT DOCUMENTS 2,833,326 A    5/1958  Knohl
3,093,028 A *  6/1963  Mathie ............... F16B 25/0031
                                           411/387.4
(Continued)

OTHER PUBLICATIONS

Search Report.

*Primary Examiner* — Flemming Saether
(74) *Attorney, Agent, or Firm* — Alix, Yale & Ristas, LLP

(57) ABSTRACT

A screw for securing dense wood material has a head with a specially configured drive socket and an underside with an array of lobes. The lobes preferably have a left-handed orientation and have chamfered extremities. The shank is specially configured with an upper thread, an intermediate unthreaded portion and a lower thread which terminates with a half-point tip. In one embodiment, the upper thread major diameter is slightly smaller than the major diameter of the lower thread. The upper thread has a greater thread density than the lower thread. The upper to lower thread-per-inch density is preferably in the range of 1.3:1 to 1.7:1. The screw is specifically configured to assist in applications where there are wet fibers near the wood deck surface.

20 Claims, 5 Drawing Sheets

(58) Field of Classification Search
USPC .............. 411/386, 387.1, 388, 413, 187, 188
See application file for complete search history.

(56) References Cited

U.S. PATENT DOCUMENTS

| | | | | |
|---|---|---|---|---|
| 3,322,019 | A * | 5/1967 | Lovisek | .............. F16B 25/0031 |
| | | | | 411/386 |
| 4,812,095 | A | 3/1989 | Piacenti, Jr. | |
| 5,217,339 | A * | 6/1993 | O'Connor | .............. E04D 3/3603 |
| | | | | 411/161 |
| 5,772,376 | A * | 6/1998 | Konig | ................... F16B 35/065 |
| | | | | 411/188 |
| 6,394,725 | B1 | 5/2002 | Dicke | |
| 6,966,737 | B2 * | 11/2005 | McGovern | ............ F16B 5/0275 |
| | | | | 411/387.2 |
| 7,014,406 | B2 * | 3/2006 | Robertson | ............. F16B 35/065 |
| | | | | 411/161 |
| 7,255,523 | B2 * | 8/2007 | Laan | ..................... F16B 5/0275 |
| | | | | 411/411 |
| 7,334,976 | B2 * | 2/2008 | Dicke | ................... F16B 35/065 |
| | | | | 411/188 |
| 8,348,575 | B2 * | 1/2013 | Walther | ............. F16B 25/0015 |
| | | | | 411/399 |
| 2002/0110439 | A1 | 8/2002 | Craven | |
| 2007/0128001 | A1 * | 6/2007 | Su | ........................ F16B 5/0275 |
| | | | | 411/413 |
| 2009/0185880 | A1 | 7/2009 | Gong | |
| 2012/0251264 | A1 | 10/2012 | Taylor | |
| 2013/0302110 | A1 * | 11/2013 | Park | ................... F16B 25/0036 |
| | | | | 411/387.1 |

\* cited by examiner

WOOD DECKING SCREW

FIELD OF THE INVENTION

The disclosed invention relates to fasteners employed for fastening wood materials to a support structure. More particularly, this disclosure relates to screws employed for securing dense wood materials, such as members of a decking or similar structure.

BACKGROUND

Materials which are used for constructing decks have increasingly involved employing denser materials, such as dense woods. The increased denseness can adversely impact the effectiveness of conventional deck screws. Many deck screws which were adapted to perform with composite materials of lower densities are significantly less effective when used to fasten denser wood materials. The difficulties of driving fasteners into very dense materials have become a significant obstacle in deck construction. It would thus be useful to have a decking screw that performs reliably with very dense decking materials.

SUMMARY

Briefly stated, a screw for securing dense wood material comprises a head defining a socket and having an underside comprising an array of lobes protruding at the underside. The lobes preferably have a chamfered or rounded lower extremity. A neck integrally extends from the head and symmetrically tapers about a central longitudinal axis. A shank integrally transitions from the neck and terminates in a half-point tip.

The shank has, from a proximal end to a distal end, a first threaded portion having a first thread density and a first major diameter, a second threaded portion having a second threaded density and a second major diameter and an intermediate unthreaded portion between the first and second threaded portion. The first thread density is greater than the second thread density, and the first major diameter is less than the second major diameter.

The lobes are preferably oriented in left-handed fashion and have substantially the same shape. There are preferably 5-10 lobes. One preferred deck screw has 8 lobes.

The ratio of the first thread density to the second thread density has a range of 1.3:1 to 1.7:1. The second major diameter exceeds the first major diameter in the range of approximately 0 to 0.015 inches. The first thread density is preferably 12-16 TPI and the second thread density is preferably 7-13 TPI. In one preferred embodiment, the first thread density is 14 TPI and the second thread density is 9 TPI. The socket preferably has a hexalobular geometry.

DETAILED DESCRIPTION

Figure 2:
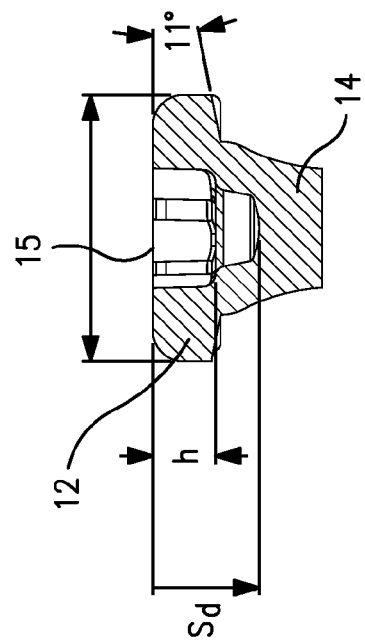
FIG. 2 is an enlarged sectional view, partly in diagram form, of the upper portion of the screw taken along the B-B line of FIG. 1.
Figure 1:
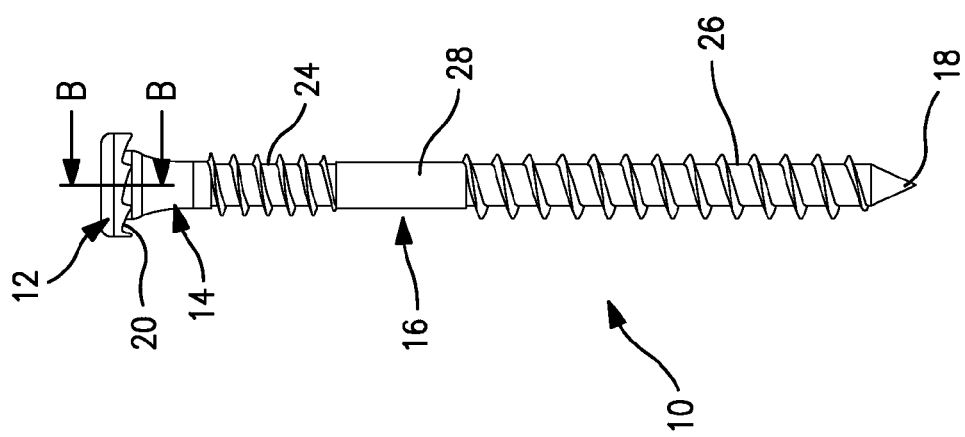
FIG. 1 is a side elevational view of a wood decking screw.
Figure 5:
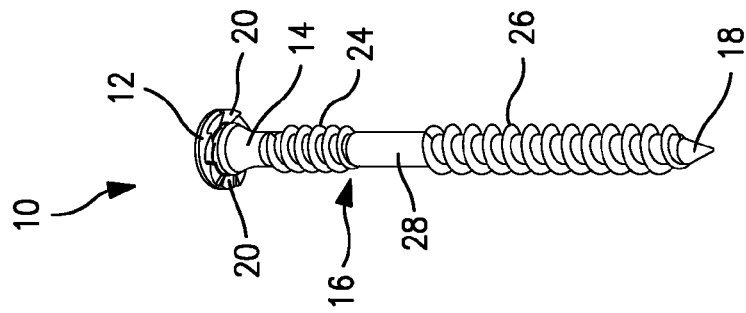
FIG. 5 is a generally bottom perspective view of the screw of FIG. 1.
Figure 4:
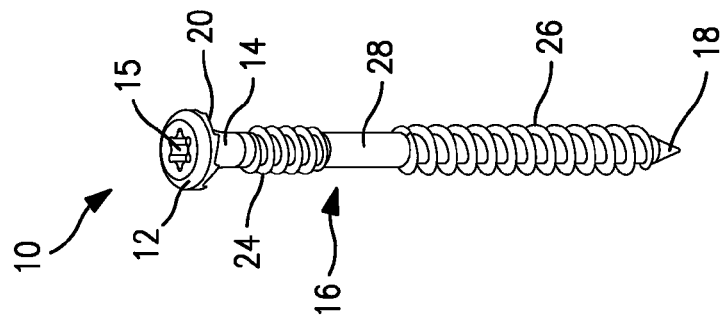
FIG. 4 is a generally top perspective view of the screw of FIG. 1.

With reference to the drawings wherein like numerals represent like parts throughout, a wood decking screw is generally designated by reference numeral 10. The disclosed screw 10 is particularly adapted for securing dense wood material (not shown) to a substructure (not shown), such as may be employed in constructing a decking structure.

A preferred embodiment of the decking screw 10 is formed from 1022 carbon steel or 10B21 carbon steel and is heat treated and plated with a corrosion-resistant plating, for example, zinc plating. This preferred material and treatment is non-limiting.

The decking screw 10 comprises a radially enlarged head 12 and an integrally extending neck 14 extending therefrom and transitioning to an integrally extending shank 16 which extends longitudinally from a proximal end and terminates in a specifically configured tip 18 at its distal end. The configurations of the tip 18, shank 16, neck 14 and head 12, acting in cooperation, provide efficient, clean and perpendicular driving into a wide range of materials, including woods having different densities, moisture contents, grain patterns and/or grain orientations, without leaving fibrous pieces or remnants of material extending in the vicinity of the driven head 12 as occurs with many known fasteners.

Figure 8:
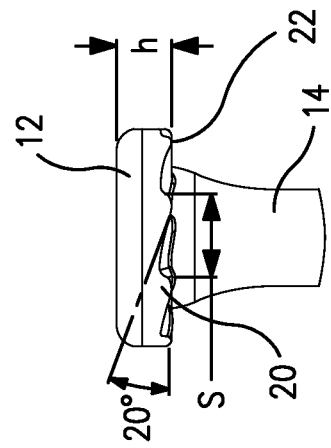
FIG. 8 is an enlarged side view, partly in diagram form, of the upper portion of the screw of FIG. 1.

The head 12 centrally defines top access to a TTAP-25 drive socket 15. The outer diameter of the head 12 in one embodiment is 0.340 inches (see FIG. 10). The socket 15 has a penetration depth $S_d$ which is preferably approximately 0.14 inches and is adapted to rotatably couple with a TTAP-25 driver (not shown). In this regard, the socket recess is hexalobular and preferably includes a central dimple-like recess. Together, the driver and socket, upon coupling, are configured to minimize wobbling. The head 12 is configured to impart increased stability upon receiving and coupling with the driver. Upon application of torque to the driver, the screw 10 is easily driven—even into dense material, like hard woods for decking. FIG. 8 shows the dimensions of a preferred embodiment of the head 12 wherein h is approximately 0.090 inches.

Figure 3:
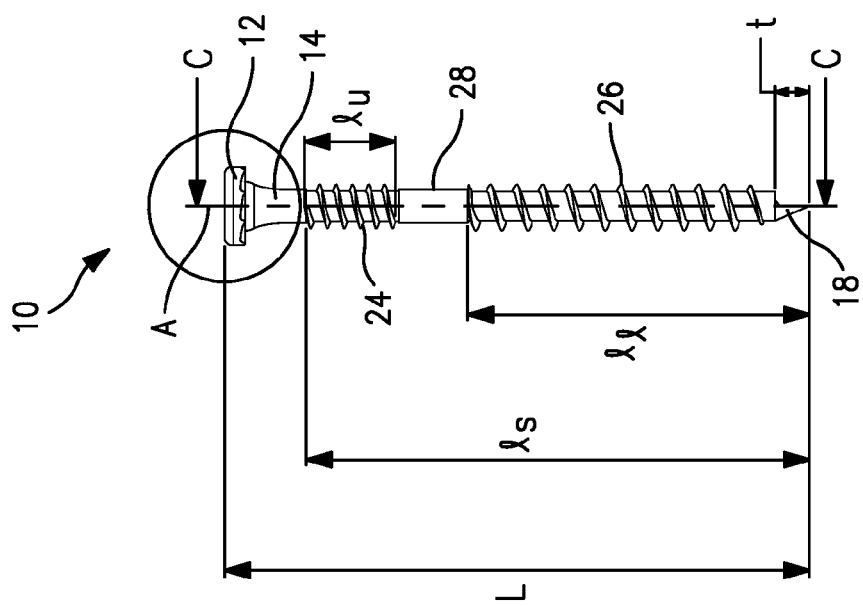
FIG. 3 is a side elevational view, partly in diagram form, of the screw of FIG. 1 taken from the right side thereof.

As shown in FIG. 3, the neck 14 tapers from the central underside of the head 12 generally symmetrically about a central longitudinal axis A through the shank 16. In the depicted embodiment, the neck 14 has a generally smooth outer surface, without threading. The neck is configured with a negative or inverse chamfer, which cooperatively improves performance over known decking screws by displacing less wood as the head portion is driven into the wood.

Figure 7:
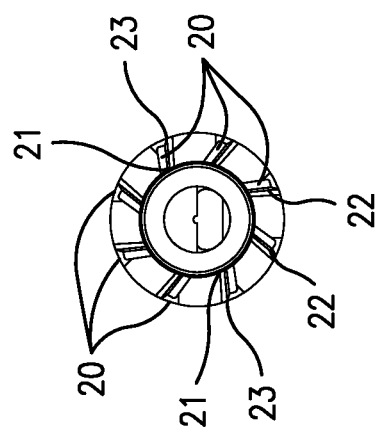
FIG. 7 is an enlarged bottom plan view of the screw of FIG. 1.
Figure 6:
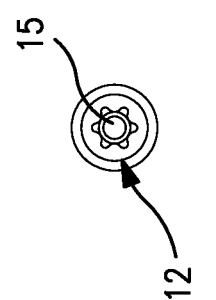
FIG. 6 is a top plan view of the screw of FIG. 1.

An array of substantially identical angularly spaced compression lobes 20 protrude from the underside of the head about the neck 14. An angular array of flutes is essentially formed between the lobes 20. The lobes 20 are preferably formed with chamfer radii or are rounded at the lower extremity 22 and extend non-radially from an inboard portion 21 adjacent the neck 14 to a well-defined outboard peripheral edge 23 (FIG. 7). The lobes 20 are not sharply defined along the lower extremity 22 except at the outboard peripheral edge 23. The lobes 20 preferably have a left-handed orientation for a conventional right-hand drive threading. Stated differently, as the screw is torqued to secure the decking, the outboard edge 23 of each lobe 20 trails the inboard portion 21. The left-handed formed lobes 20 force stickier fibers of wet surface wood downward, rather than tearing the fibers like many known decking screws. The sharper outboard edges 23 tend to sever any peripheral fiber material. Preferably, the head 12 includes approximately 5-10 uniformly spaced left-handed lobes. In the illustrated embodiment of FIGS. 7 and 8, eight substantially identical lobes 20 protrude from the underside of the head and are spaced at a circumferential uniform distance S of approximately 0.130 inches. Of course, embodiments exist with lobes oriented oppositely—right-handed—and for various numbers of lobes.

As shown in FIGS. 1, 3, 4 and 5, the shank 16 has an upper threaded portion 24 longitudinally spaced from a lower threaded portion 26 by an unthreaded intermediate portion 28. Preferably, the spacing between threads in the upper portion 24 is smaller than the spacing between the lower threads 26 (i.e., the upper threading is denser with a greater TPI than the lower threading). Preferably, the upper threading is approximately 12-16 threads per inch (TPI), while the lower threading is approximately 7-13 TPI with an upper:lower TPI ratio within the approximate range of 1.3:1 to 1.7:1. More preferably, the upper threading is approximately 14 TPI with a 35° included thread angle, while the lower threading is approximately 9 TPI with a 40° included thread angle. The denser upper threading 24 is specifically configured to assist in pulling down wet fibers near the decking wood surface during installation.

With reference to FIGS. 2 and 3, various approximate longitudinal dimensions are set forth for two deck screws 10 in Table I as follows:

TABLE I

| DIMENSION | SCREW A | SCREW B |
| --- | --- | --- |
| L | 2.50 ins | 3.00 ins |
| $l_s$ | 2.25 ins | 2.75 ins |
| $l_u$ | 0.39 ins | 0.39 ins |
| $l_l$ | 1.29 ins | 1.79 ins |
| t | 0.15 ins | 0.15 ins |
| h | 0.10 ins | 0.10 ins |
| $S_d$ | 0.14 ins | 0.14 ins |

Figure 10:
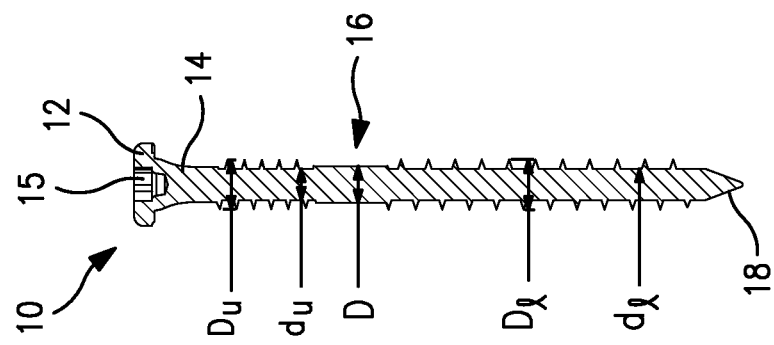
FIG. 10 is a side sectional view, partly in diagram form, to further illustrate dimensional features of the screw of FIG. 1, taken along the lines C-C thereof.
Figure 9:
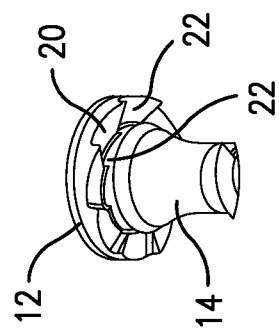
FIG. 9 is an enlarged generally bottom perspective view of the upper portion of the screw of FIG. 1.

With additional reference to FIG. 10, the upper thread major diameter $D_u$ is approximately 0.195 inches and the lower thread major diameter $D_l$ is approximately 0.205 inches. The minor diameter $d_u$ for each of the upper threads and the lower threads $d_l$ is 0.128 inches. The diameter D of the unthreaded portion is approximately 0.147 inches. Naturally, other dimensions are also possible.

The upper thread major diameter $D_u$ is preferably slightly smaller than the major diameter $D_l$ of the lower thread. In a preferred embodiment, the upper thread major diameter $D_u$ is within 0.015 inches of the lower thread major diameter $D_l$ (FIG. 10). Stated differently: $0 \leq D_l - D_u \leq 0.015$ inches.

The longitudinal position and length of the unthreaded intermediate portion 28 is adapted to stretch across the shear plane between two fastened pieces of material (for example, decking wood) once the screw 10 is driven. The longitudinal position and length can be altered according to the thickness of material used.

With reference to FIG. 3, the lower threaded portion 26 terminates in a half point tip 18 disposed at the distal end of the screw 10. The half point tip 18 effectively cuts into the decking material to assist in providing a pilot bore. In one preferred embodiment, the half point tip 18 extends a longitudinal length t of approximately 0.150 inches.

Figure 13:
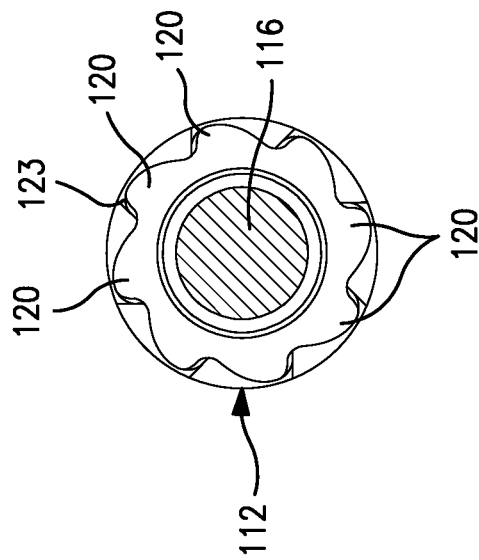
FIG. 13 is an enlarged sectional view, taken along the line 13-13 of FIG. 12.
Figure 12:
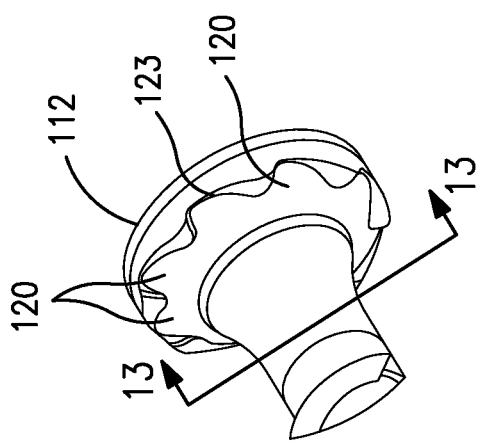
FIG. 12 is an enlarged fragmentary perspective view of the wood decking screw of FIG. 11.
Figure 11:
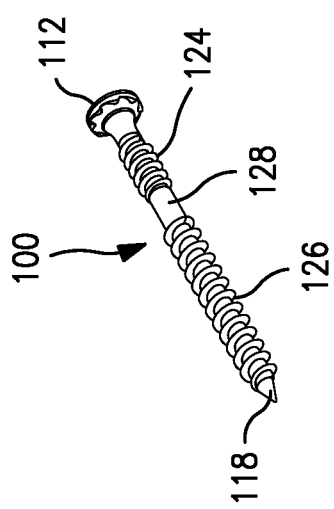
FIG. 11 is a generally bottom perspective view of another embodiment of a wood decking screw.

FIGS. 11-13 show another embodiment of a wood decking screw 100. Many of the elements and features of this embodiment can be considered to be parallel to corresponding elements and features for the screw 10 of FIGS. 1-10. The shank portion 116 includes upper threaded portion 124 separated from lower threading 126 by an unthreaded intermediate portion 128. As with the screw 10, the shank 116 extends longitudinally from a distal end and terminates in a specifically configured half point tip 118 at its proximal end. Screw 100 preferably has physical properties that are within the same general ranges as those described for screw 10, including without limitation lengths, diameter, socket characteristics, and total and relative TPI for the upper and lower threaded portions (124 and 126).

The departure from the previous embodiment can be appreciated best with reference to the enlarged underside head portions of FIGS. 11-13. As shown, the lobes 120 on the underside of the head 112 have relatively smooth more bulbous geometry in contrast to the more abrupt lower extremities of the lobes 20 (screw 10). The head 112 includes a plurality of asymmetrical (i.e., smooth or rounded) lobes 120 with a fatter profile around its underside periphery. The combination of the more contoured surface of the lobes 120 and asymmetrical sloped extremities has been shown to provide a substantial improvement over known screws or fasteners. The underside array of lobes 120 in the screw 100 is also preferably left-handed in orientation. The relatively smooth outer contour of the lobes 120, together with the relatively sharp underside/outer edge 123, assist further in efficiently and cleanly cutting, capturing and forcing the stickier and thinner fibers of wet surface wood downward without tearing or breaking the fibers or pushing/wedging the wood particles outwardly like many known decking screws.

Applying torque to the screw 100 easily drives it into the decking material without damaging the wood by cutting, capturing and pressing surface wood—even the most fibrous of wood materials. Unlike known screws that tend to "wedge" into and split the material, there is very little or no surface wood remnants extending in the vicinity of the head of the disclosed screw (10 or 100), once driven. The disclosed screw 100, having a combination of the tip 118, shank 116, neck 114 and head 112, enables efficient, clean and perpendicular driving into a wide range of materials, including woods having different densities, moisture contents, grain patterns and/or grain orientations.

While preferred embodiments have been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

The invention claimed is:

1. A wood deck screw comprising:
   a head defining a socket and having an underside and comprising an array of angularly spaced compression lobes protruding at the underside and having a chamfered lower extremity, the lobes extending non-radially from an inboard position to a well-defined trailing outboard peripheral edge, the lobes having an array of flutes formed between them;
   a neck extending from said head and symmetrically tapering about a central longitudinal axis; and
   a shank integrally transitioning from said neck and terminating in a half-point tip, said shank having, from a proximal end to a distal end, a first right-hand threaded portion having a first thread density and first major diameter, a second right-hand threaded portion having a second thread density and a second major diameter and an intermediate unthreaded portion between said first and second threaded portions, the first thread density being greater than the second thread density and the first major diameter being less than the second major diameter.

2. The wood deck screw of claim 1 wherein said lobes have a left-handed orientation.

3. The wood deck screw of claim 1 wherein said lobes have substantially the same shape.

4. The wood deck screw of claim 1 wherein there are 5-10 lobes.

5. The wood deck screw of claim 1 wherein the ratio of the first thread density to the second thread density has a range of 1.3:1 to 1.7:1.

6. The wood deck screw of claim 1 wherein the second major diameter exceeds the first major diameter by approximately 0.015 inches.

7. The wood deck screw of claim 1 wherein the first thread density is 12-16 TPI and the second thread density is 7-13 TPI.

8. The wood deck screw of claim 1 wherein the first thread density is 14 TPI and the second thread density is 9 TPI.

9. The wood deck screw of claim 1 wherein the socket has a hexalobular geometry.

10. A wood deck screw comprising:
    a head defining a socket and having an underside and comprising an array of angularly spaced compression lobes protruding at the underside and having a rounded lower extremity the lobes extending non-radially from an inboard position to a well-defined trailing outboard peripheral edge in a left-handed orientation;
    a neck extending from said head and symmetrically tapering about a central longitudinal axis; and
    a shank integrally transitioning from said neck and terminating in a half-point tip, said shank having, from a proximal end to a distal end, a first right-hand threaded portion having a first thread density and first major diameter, a second right-hand threaded portion having a second thread density and a second major diameter and an intermediate unthreaded portion between said first and second threaded portions, the first thread density being greater than the second thread density, and the first major diameter being less than or equal to the second major diameter, and the ratio of the first thread density to the second thread density is in the range 1.3:1 to 1.7:1.

11. The wood deck screw of claim 10 wherein there are 5-10 lobes and said lobes have substantially the same shape.

12. The wood deck screw of claim 10 wherein the second major diameter exceeds the first major diameter by approximately 0.010 inches.

13. The wood deck screw of claim 10 wherein the first thread density is 12-16 TPI and the second thread density is 7-13 TPI.

14. The wood deck screw of claim 10 wherein there are 8 lobes.

15. The wood deck screw of claim 10 wherein the socket has a hexalobular geometry.

16. A wood deck screw comprising:
    a head defining a socket and having an underside and comprising an array of angularly spaced compression lobes protruding at the underside and having a chamfered extremity, the lobes extending non-radially from an inboard position to a well-defined trailing outboard peripheral edge, the lobes having an array of flutes formed between them;
    a neck extending from said head and symmetrically tapering about a central longitudinal axis; and
    a shank integrally transitioning from said neck and terminating in a tip, said shank having, from a proximal end to a distal end, a first right-hand threaded portion having a first thread density and first major diameter, a second right-hand threaded portion having a second thread density and a second major diameter and an intermediate unthreaded portion between said first and second threaded portions, the first thread density being greater than the second thread density and the first major diameter being less than the second major diameter.

17. The wood deck screw of claim 16 wherein there are 8 lobes.

18. The wood deck screw of claim 16 wherein the ratio of the first thread density to the second thread density has a range of 1.3:1 to 1.7:1.

19. The wood deck screw of claim 16 wherein the second major diameter exceeds the first major diameter by approximately 0.010 inches.

20. The wood deck screw of claim 16 wherein the first thread density is 12-16 TPI and the second thread density is 7-13 TPI.

* * * * *